US008049753B2

(12) United States Patent
Andersson

(10) Patent No.: US 8,049,753 B2
(45) Date of Patent: Nov. 1, 2011

(54) COMPUTER GRAPHICS METHODS AND SYSTEMS FOR GENERATING IMAGES WITH ROUNDED CORNERS

(75) Inventor: Hakan Andersson, Eskilstuna (SE)

(73) Assignee: Mental Images GmbH, Berlin (DE)

( * ) Notice: Subject to any disclaimer, the term of this patent is extended or adjusted under 35 U.S.C. 154(b) by 1037 days.

(21) Appl. No.: 11/843,535

(22) Filed: Aug. 22, 2007

(65) Prior Publication Data
US 2008/0129733 A1    Jun. 5, 2008

Related U.S. Application Data

(60) Provisional application No. 60/823,312, filed on Aug. 23, 2006.

(51) Int. Cl.
*G06T 15/50*     (2011.01)
(52) U.S. Cl. ........................................ 345/426
(58) Field of Classification Search .................. None
See application file for complete search history.

(56) References Cited

U.S. PATENT DOCUMENTS

| 5,966,134 | A  | * | 10/1999 | Arias ............................ 345/589 |
| 6,163,319 | A  |   | 12/2000 | Peercy |
| 6,300,952 | B1 | * | 10/2001 | Sidwell et al. ................ 345/419 |
| 6,441,816 | B1 | * | 8/2002  | Nguyen et al. ................ 345/420 |
| 2007/0139408 | A1 | * | 6/2007 | Keranen ........................ 345/426 |

OTHER PUBLICATIONS

Mental Ray "Architectural Shaders" Jun. 16, 2006, Mental Images, version 0.9.0, pp. 1, 59-60.*
Blinn, "Simulation of Wrinkled Surfaces", Computer Graphics, vol. 12 (3), pp. 286-292, SIGGRAPH-ACM (Aug. 1978).
Laine, Samuli, "Soft Shadow Volumes", Jul. 2005, pp. 1156-1165, ACM.
Agrawala, Maneesh, "Efficient Image-Based Methods for Rendering Soft Shadows", Jul. 2000, ACM, pp. 375-384.
Notice of Reasons for Rejection from Japanese Patent Application No. 2009-525764, dated Apr. 5, 2011.

* cited by examiner

*Primary Examiner* — Ulka Chauhan
*Assistant Examiner* — Andrew G Yang
(74) *Attorney, Agent, or Firm* — Jacobs & Kim LLP; David Jacobs

(57) ABSTRACT

Methods, systems, apparatus, and computer program/software code products, operable in a computer graphics system designed to render images and to apply shading to images, enable the following: during rendering of an image, modifying the shading normal in the region of a corner of an object in the image, such that when shading is applied to the image, the shaded image is capable of providing to a human viewer, when viewing the corner in the image, the appearance or visual illusion of a rounded corner, wherein the modifying comprises: calculating an amount of modification to be applied to an original shading normal in the region of the corner to simulate the appearance of a given fillet radius R, the calculating comprising: interrogating surfaces within a distance R of the corner for their shading normal, and calculating a new normal that is a weighted blend between the shading normal of the original surface and the shading normal of the interrogated neighboring surface, thereby, by the shading effect, to simulate at render-time a rounding by varying the shading normal, creating a variation of the surface normal consistent with the appearance the object would have had, had it actually been rounded.

10 Claims, 14 Drawing Sheets

COMPUTER GRAPHICS METHODS AND SYSTEMS FOR GENERATING IMAGES WITH ROUNDED CORNERS

CROSS-REFERENCE TO RELATED APPLICATION

This application for patent Ser. No. 11/843535 claims the priority benefit of U.S. Provisional Patent Application Ser. No. 60/823,312, filed Aug. 23, 2006, incorporated herein by reference as if set forth in its entirely.

FIELD OF THE INVENTION

The present invention relates to the field of computer graphics, and more particularly, to improved methods and systems that enable the creation, within a computer-based system for synthetic image rendering, of the visual appearance of filleted edges or rounded corners on polygonal objects.

BACKGROUND OF THE INVENTION

The use of computer graphics systems and software for computer graphics systems, particularly such systems and software adapted for the generation and rendering of three-dimensional images, continues to grow at an explosive rate, as demand from the motion picture industry and others increases.

Users of software for the realistic rendering of three-dimensional images demand the highest possible realism in the resulting images. Yet the modeling tools at their disposal tend to create model objects with an unrealistic mathematical precision, where every edge is completely sharp and angular. Edges in the "real world" are typically rounded or worn, if ever so slightly.

One solution to this problem has been to explicitly model these roundings as chamfers or fillets in the actual 3D model. Although this approach results in more natural looking edges, it also causes higher complexity, i.e., an increase in polygon count, and a much more complex model.

It would be desirable to provide methods and systems capable of rendering more realistic three-dimensional images, with the appearance of rounded corners or filleted edges, without significant increases in process complexity or storage requirements.

SUMMARY OF THE INVENTION

One aspect of the invention relates to methods, systems, devices, apparatus, and/or computer program/software code products operable in a computer graphics system operable to render images and to apply shading to images, and operable to enable the computer graphics system to provide images in which objects have the appearance of rounded corners. In one aspect of the invention, the methods, systems, devices, apparatus, and/or computer program/software code products relate to the following: during rendering of an image, modifying the shading normal in the region of a corner of an object in the image, such that when shading is applied to the image, the shaded image is capable of providing to a human viewer, when viewing the corner in the image, the appearance or visual illusion of a rounded corner, wherein the modifying comprises:

(1) calculating an amount of modification to be applied to an original shading normal in the region of the corner to simulate the appearance of a given fillet radius R, the calculating comprising:

(2) interrogating surfaces within a distance R of the corner for their shading normal, and calculating anew normal that is a weighted blend between the shading normal of the original surface and the shading normal of the interrogated neighboring surface, (3) thereby, by the shading effect, to simulate at render-time a rounding by varying the shading normal, creating a variation of the surface normal consistent with the appearance the object would have had, had it actually been rounded.

In a further aspects of the invention, the weighting begins at the distance R, where it completely favors the original shading normal, and continues to a point where the distance to the neighboring face is effectively zero, and in which a weighting function is used to determine a blend ratio of the two normals as a function of this distance. Different weighting functions yield different apparent profiles of the edge of the corner.

In one aspect of the invention, the weighted modification of the shading normal is performed in a similar fashion on both adjacent faces of a corner as they are rendered, so that the edge region of both surfaces have an apparent shading in which each visually lades toward the other.

The weighting function can be selected such that at the actual geometric edge of the corner, where the distance to the neighbor is effectively zero, the weighting function yields the same result for both faces, with a substantially 50/50 blend of the two surface normals, so that substantially no discontinuity can be visually perceived in the shading of the edge, and it can be perceived as smooth by a human viewer, thereby enabling the illusion of a round corner.

In another aspect of the invention, in a computer graphics system operable to render images using an image rendering process, and to apply shading to rendered images using a shading model, and wherein, as a surface point P is being shaded, it is assumed to have one shading normal $N_s$ and one geometric normal $N_g$, the methods, systems, devices, apparatus and/or computer program code/software products aspects of the invention provide for: modifying the shading normal in the region of a corner of an object in the image such that the region of the corner of the object in the image will, when shaded by using a shading model, provide to a human viewer the visual appearance of a rounded edge, the modifying comprising: interrogating the nearby region of the corner for adjacent surfaces within a radius of R of the corner, wherein R is the apparent fillet radius for the corner.

In a further aspect of the invention, where the computer graphics system is operable to render images by applying a shading model to geometric representations constructed from a scene description containing geometric primitives, the interrogating comprises querying data structures associated with the scene for adjacency information usable to find adjacent surfaces within a radius R of the corner.

In another aspect of the invention, wherein the interrogating comprises executing a ray-casting process, the ray-casting process can comprise: finding a tangent plane defined by two vectors, u and v, that are tangential to the geometric normal of a currently shaded primitive of the image, wherein vector finding is accomplished by selecting an arbitrary vector and projecting it into the plane of the geometric normal to find the u vector, and using a cross product to find the vector v.

The ray casting can further comprise displacing the source point of the ray casting process a selected small distance; wherein if the point is displaced along the negative direction of the geometric normal vector, convex corners are found; and if the point is displaced along the positive direction, concave corners are found. The ray casting can further comprise firing a set of n substantially evenly spaced rays within the plane defined by the u and v vectors, and recording any surfaces hit.

In a further aspect of the invention, the process further composes modifying the normal, wherein for each primitive hit by the cast rays, a shading normal $H_n$ of the primitive is calculated at the hit point, as well as the distance to the hit point, D;

if D>R, the hit is disregarded, but if D<R, a weight factor is calculated in accordance with:

$$f=[1-(D/R)]\cdot[1-(N_s\cdot H_n)]^2;$$

and then, the normal $H_n$ is weighted by factor f, and the result is added to the current shading normal, $N_s$. When all n rays have been sent, the shading normal $N_s$ is re-normalized to have unit length, and then, the new shading normal can be used by a shading model for shading the image.

The new shading normal can be further modified by bump mapping before being used by a shading model for shading the image.

Where ray casting is not used, and instead adjacency information is available, a slight variation can be employed, wherein the process further comprises modifying the normal, wherein for each primitive found using the adjacency information, a shading normal $H_n$ of the found primitive is calculated at the closest perpendicular point D for the found primitive, and a distance to point D is also calculated; if D>R, the point is disregarded, but if D<R, a weight factor is calculated in accordance with:

$$f=[1-(D/R)]\cdot[1-(N_s\cdot H_n)]^2;$$

and then, the normal $H_n$ is weighted by factor f, and the result is added to the current shading normal, $N_s$. Again, re-normalizing and bump mapping can be utilized.

BRIEF DESCRIPTION OF THE DRAWINGS

FIG, 3A is a diagram of a shading technique according to the prior art.

DETAILED DESCRIPTION OF THE INVENTION

Figure 1:
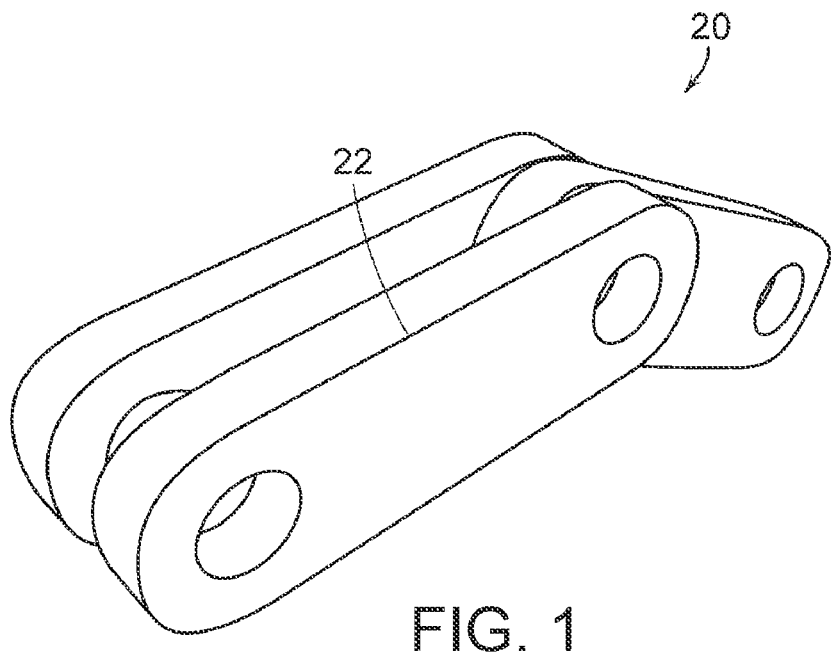
FIG. 1 shows an image, rendered according to the prior art, containing unnaturally sharp edges.
Figure 2:
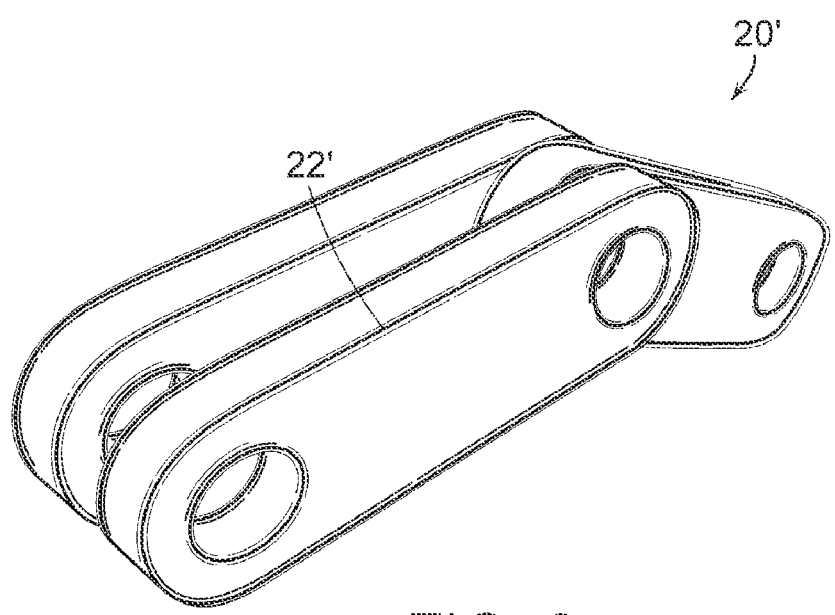
FIG. 2 shows an image, rendered in accordance with aspects of the present invention, in which a rounded visual appearance has been created for the sharp edges in the FIG. 1 image.

The systems and techniques described herein provide a shading effect consistent with a rounded edge. FIG. 1 shows an example of an image 20 containing overly sharp edges 22. FIG. 2 shows a version of the image 20', which has been modified in accordance with the described systems and techniques to create the visual impression of rounded edges 22'. As described in further detail below, in FIG. 2, the underlying geometry of the modeled object has not been modified.

Thus, the present invention provides systems and techniques for providing rounded corners and edges without substantially greater complexity. The described systems and techniques shift the generation of these edges into the realm of rendering, reducing the modeler's burden, and providing a novel, render-time approach for calculating the proper shading for providing the appearance of a rounded corner or filleted edge.

The present description of the invention is organized into the following sections:
1. Overview
2. Example of Render-Time Rounded Corners
    2.1 Finding the Tangent Plane
    2.2 Displacing the Source Point
    2.3 Casting the Rays
    2.4 Modifying the Normal
    2.5 Subsequent Processing
    2.6 Further Example(s)
    2.7 General Techniques
3. Digital Processing Environment in Which Invention Can Be Implemented
1. Overview Shading in computer graphics is typically determined by the direction of the shading normal vector for each point on each surface to be shaded relative to the direction(s) of the incoming ray(s) of light. The presently described systems and techniques are based on modifying an object's surface shading normals to be consistent with the appearance the modeled object would have, if its geometry had actually been rounded.

Figure 3A:
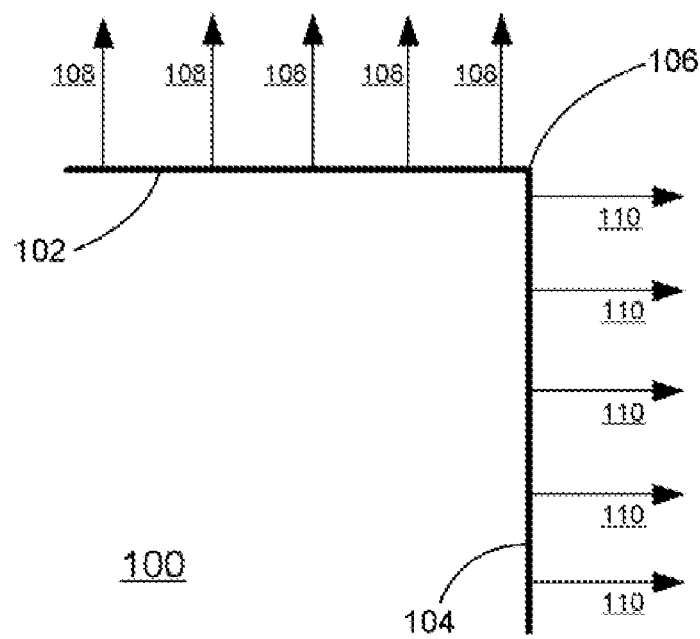
FIG. 3B is an image created using the technique illustrated in FIG. 3A.
FIG. 3C is a diagram of a technique for rounding edges according to the prior art and FIG. 3D is an image created using the technique illustrated in FIG. 3C.
FIG. 3E is a diagram of a technique for creating a visual appearance of a rounded edge, according to an aspect of the present invention.
FIG. 3F is an image created using the technique illustrated in FIG. 3E.
Figure 3B:
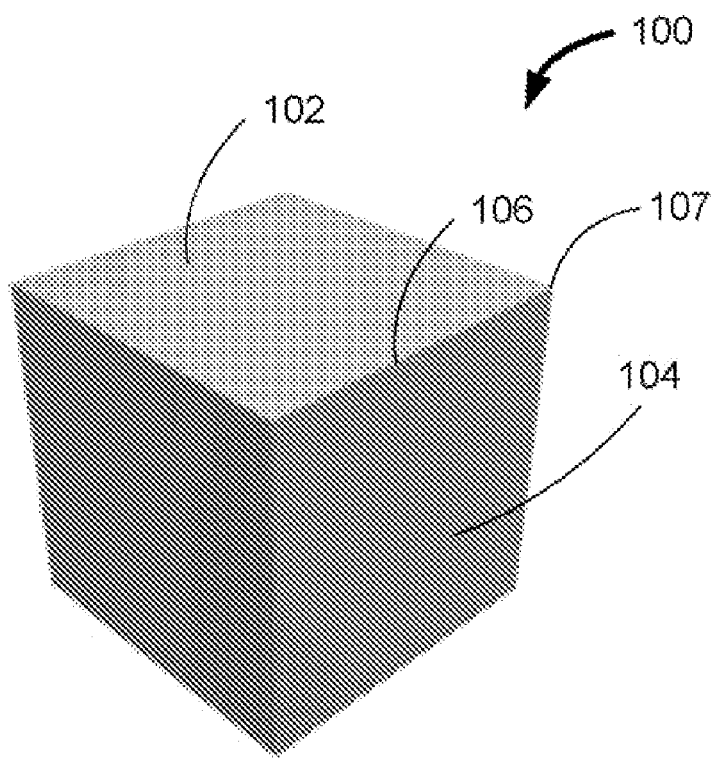

FIG. 3A is a diagram illustrating the shading of a portion of an object 100. The shaded portion of the object 100 includes a first surface 102 and a second, neighboring surface 104. The two surfaces meet at an edge 106. For each point of the first surface 102 to be shaded, there is calculated a shading normal 108, which is not necessarily the same as the geometric normal. Similarly, for each point of the neighboring surface 104 to be shaded, there is also calculated a shading normal 110. When the image is rendered, a shader uses the shading normals to determine the shading of surfaces 102 and 104. FIG. 3B shows the rendered image of object 100. It will be seen in FIG. 3B that the rendered object 100 has unnaturally sharp edges 106 and corners 107.

Figure 3C:
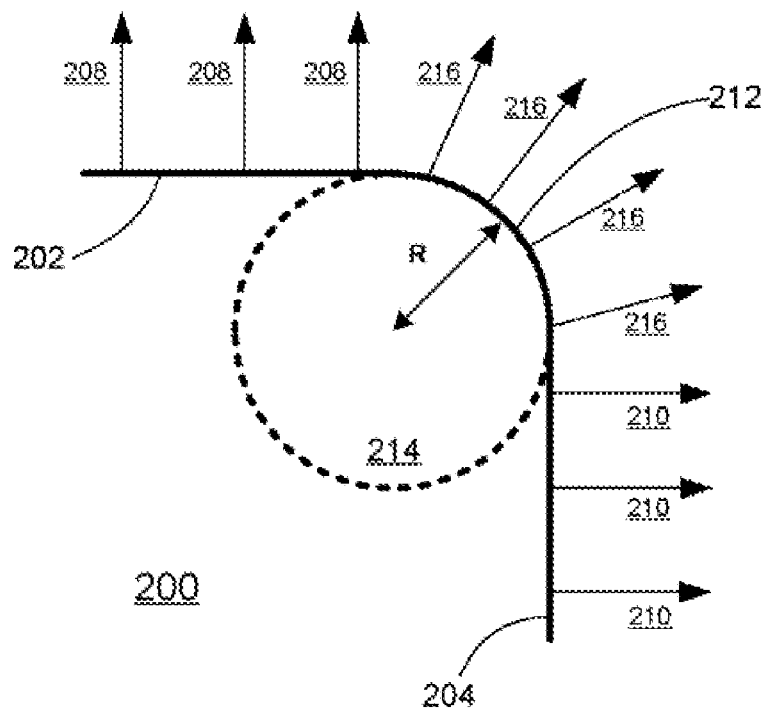
Figure 3D:
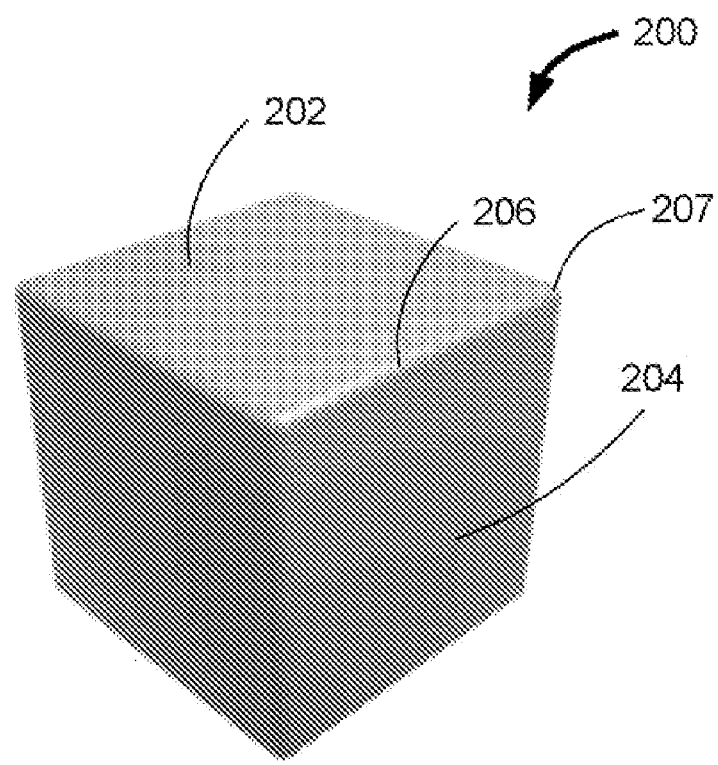

FIG. 3C is a diagram illustrating a traditional technique for addressing the issue of unnaturally sharp edges 106 and corners 107 in the rendered image of object 100. In FIG. 3C, the geometrical model of the object 200 has been modified to include a rounded transition 212 between the first and second surfaces 202 and 204. In the present example, the rounded transition 212 has a circular profile corresponding to circle 214 with radius R. Using the modified model, when the image is rendered, a first set of shading normals 208 is calculated for the first surface 202, a second set of shading normals 210 is calculated for the second surface 204, and a third set of shading normals 216 is calculated for the rounded transition portion 212. FIG. 3D shows the rendered image of modified object 200 with rounded edges 206 and corners 207. While the approach illustrated in FIG. 3C results in a more realistic image, it increases the complexity of the model, and the burden on the modeler.

Figure 3E:
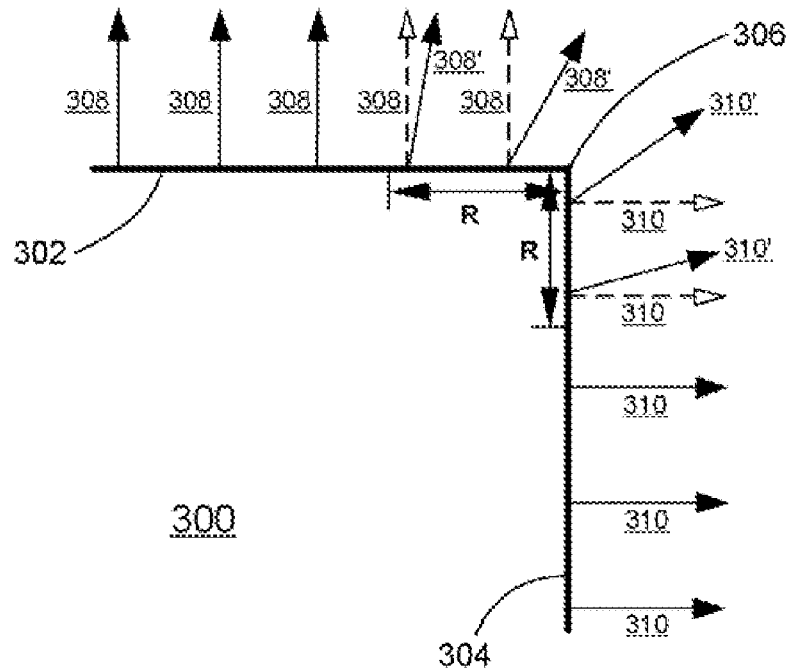
Figure 3F:
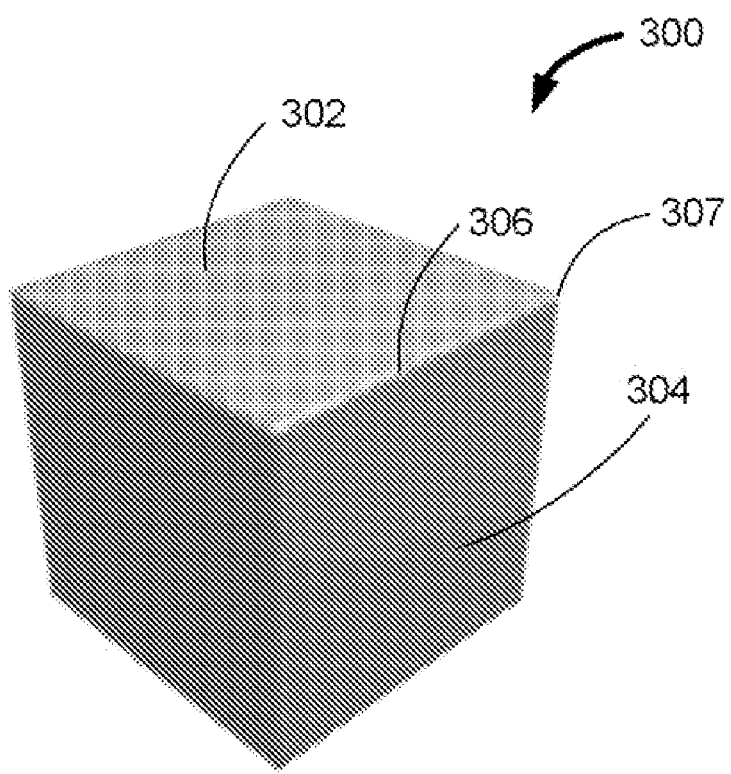

FIG. 3E is a diagram illustrating a technique according to an aspect of the present invention. In this approach, the geometry of surfaces 302 and 304 and edge 306 of object 300 is not modified. Rather, a rounded appearance is simulated during rendering by modifying the surface shading normals 308 and 310 within distance R of edge 306. The modified shading normals 308 and 310 generally correspond to the shading normals 216 of the "truly" rounded case shown in FIGS. 3C-3D, Even though the underlying geometry of surfaces 302 and 304 and edge 306 is unmodified, the modification of the shading normals 308' and 310' results in a more natural, rounded appearance, as shown in rendered image of the object 300 shown in FIG. 3F. Thus, the described technique allows the creation of rounded edges 306 and corners 307 without increasing the complexity of the model, and without increasing the burden on the modeler.

To calculate the amount of modification applied to the original shading normal to simulate the appearance of a given fillet with a specified radius R, neighboring surfaces within the distance R are interrogated for their shading normal. A new normal is generated that is a weighted blend between the shading normal of the original surface and the shading normal of the interrogated neighboring surface.

The weighting begins at the distance R to completely favor the original shading normal all the way to the point where the distance to the neighboring face is effectively zero. A weighting function is used to decide the blend ratio of the two normals as a function of this distance. Different weight functions yield different apparent profiles of the edge.

This weighted skewing of the shading normal is performed in similar fashion on both faces as they are rendered, causing the edge region of both surfaces to have a shading that fades towards the other.

When the weight function is chosen such that at the actual geometric edge, i.e., where the distance to the neighbor is effectively zero, it yields the same result for both faces, for example, a 50% blend of the two surface normals, no discontinuity will be seen in the shading of the edge, and it will be perceived as "smooth," permitting a perfect visual impression of a rounded corner.

2. Example of Render-Time Rounded Corners

We next describe an example of render-time corner rounding in accordance with the present invention. The example described below does not utilize any special pre-generated information. However, such extensions may be added to provide a variant that is potentially slightly more optimized, at the cost of the additional storage space for neighboring face information. In particular, while the example described below utilizes a ray casting technique for interrogation, ray casting is not necessary if data structures containing adjacency information, or from which adjacency information can be derived, are available to the processor/method. The term "adjacency information" is used herein to refer to information stored in association with an image, such as information typically stored in association with respective polygons of an image, that can be used to determine polygons adjacent to a given polygon. In a number of conventional computer graphics systems, every polygon in an image contains information as to which other polygons are "near" or adjacent to that polygon. Where such information is not available, ray casting is one technique that can be used to interrogate and determine adjacent polygons or surfaces.

Those skilled in the art will understand and appreciate that the techniques and/or examples described herein may be implemented, or modified or expanded, to utilize adjacency information, in order to provide a technique that is potentially slightly more optimized, at the cost of the additional storage space necessary to store neighboring face information. When such information is available, the nearest in-plane perpendicular point on the neighboring primitive that intersects the plane of the original primitive (see example below) can be used directly, rather than the point hit by the ray casting process. In all significant ways, however, the rest of the process is substantially the same once the point on the neighboring surface is found, whichever process is used to find it.

Turning to the following illustrated example: The following example utilizes input parameter R, for the radius of the apparent rounding of the edge. No further input either from user or the geometric pipeline is required. It should be noted, however, that additional parameters may be provided for, if desired.

As each surface point P is being shaded, it is assumed to have one shading normal $N_s$ and one geometric normal $N_g$. The two normals $N_s$ and $N_g$ may or may not be identical, depending on the characteristics of the underlying surface.

The goal is to modify the shading normal $N_s$ such that, when the object is subsequently shaded using a suitable shading model such as the well-known Phong shading model, a visual appearance is created of a rounded edge.

Phong shading is an interpolation method in computer graphics, using interpolation of surface normals in rasterizing polygons, in an effort to obtain enhanced resolution of specular reflections such as those generated by the Phong reflection model. The term Phong shading may also refer to the reflection model, or to the combination of the reflection model and the interpolation method Phong shading and other shading techniques are described in Akenine-Möller & Haines, "Real-Time Rendering," 2d ed., A. K. Peters (2002), which is incorporated herein by reference in its entirety.

As mentioned above and discussed in further detail below, if no adjacency information is available, the nearby region is probed for adjacent surfaces within a radius of R. According to the present aspect of the invention, this probing of the nearby region is performed using a ray casting step or process.

2.1 Finding the Tangent Plane

Figure 4:
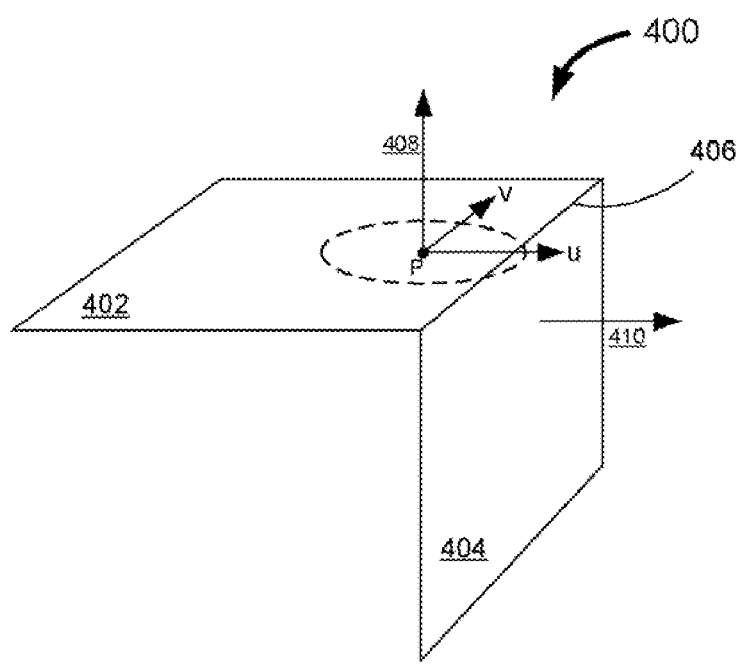
FIGS. 4 and 5 are diagrams of a portion of an object, illustrating the use of a ray casting technique to find hit points on neighboring surfaces.

FIG. 4 shows a diagram of a portion of an object 400 having a first surface 402 and a second, neighboring surface 404 that meet at an edge 406. A first shading normal 408 is shown for point P on first surface 402, and a representative second shading normal 410 is shown for second surface 404. Referring now to FIG. 4, the ray casting begins by finding two vectors, u and v, which are tangential to the geometric normal of the currently shaded primitive. This may be achieved, for example, by picking an arbitrary vector and projecting it into the plane of the geometric normal watching out for the degenerate case where the arbitrary vector is too close in orientation to the geometric normal, to find the u vector and using a cross product to find the vector v, as shown in FIG. 4.

2.2 Displacing the Source Point

Figure 5:
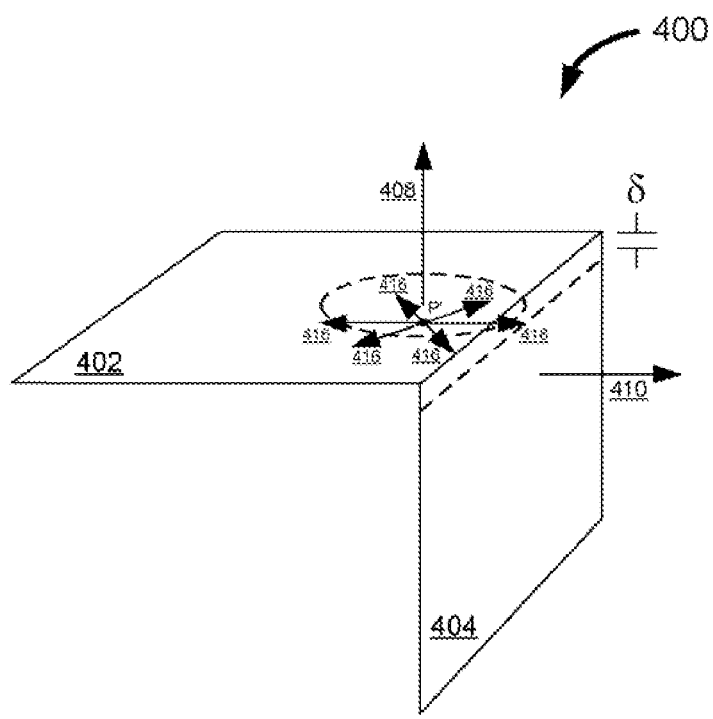

P, the point being shaded, is by definition in the plane of the currently shaded primitive. It is desirable to avoid costly and confusing self-intersections. For this reason, the start point of the ray casting process is displaced a slight distance δ, as shown in FIG. 5, not drawn to scale. In present example, the start point is displaced R/1000 along the direction of the geometric surface normal expressed as the following Equation (1):

$$P' = P - N_s\left(\frac{R}{1000}\right) \qquad \text{Eq. (1)}$$

If the point is displaced along the negative direction of the geometric normal vector, convex corners are found. If the point is displaced along the positive direction, concave corners are found.

2.3 Casting the Rays

The next step is to fire a set of n evenly spaced rays 416 within the plane defined by the u and v vectors and record any surfaces hit. Experience has shown that n=6 yields acceptable results. However, the number of rays may be varied, as desired.

2.4 Modifying the Normal

For each primitive hit by these cast rays, the shading normal $H_n$ of the hit point is calculated, as well as the distance to the hit point D. As mentioned above, the shading normal $H_n$ is not necessarily the same as the geometric normal of the hit point.

If D>R, the hit is rejected, but if D<R, a weight factor f is calculated, using the following Equation (2).

$$f=[1-(D/R)]\cdot[1-(N_s\cdot H_n)]^2 \qquad \text{Eq. (2)}$$

The hit normal $H_n$ is weighted by this factor f. The weighted hit normal $f\cdot H_n$ is then added to the current shading normal $N_s$ to generate a modified shading normal $N_s'$, expressed as the following Equation (3):

$$N_s'=N_s+f\cdot H_n \qquad \text{Eq. (3)}$$

For each point to be shaded, the above-described technique is repeated iteratively for all of the cast rays. As mentioned above, satisfactory results have been obtained using six equally spaced rays emanating from the source point. The respective weighted contributions of the shading normals of each hit point are added to the original shading normal $N_s$, as expressed by the following Equation (4):

$$N_s'=N_s+f_1\cdot H_{n1}+f_2\cdot H_{n2}+f_3\cdot H_{n3}+\ldots f_n\cdot H_{nn} \qquad \text{Eq. (4)}$$

The use of six equally spaced rays has worked reasonably well in practice, especially in the case of a "cube corner."

2.5 Subsequent Processing

When all rays are sent, the modified shading normal $N_s'$ must be renormalized to have unit length, as express in the following Equation (5):

$$N_s'=|N_s'| \qquad \text{Eq. (5)}$$

After renormalization, the modified shading normal is fed into a conventional shading model, such as the models of Phong, Ward, or the like.

According to a further aspect of the invention, the new shading normal may be further modified by traditional bump mapping before being fed into the conventional shading model. Bump mapping is described in J. F. Blinn, "Simulation of Wrinkled Surfaces", Computer Graphics, Vol. 12 (3), pp. 286-292, SIGGRAPH-ACM (August 1978), incorporated herein by reference.

2.6 Further Example(s)

Figure 6:
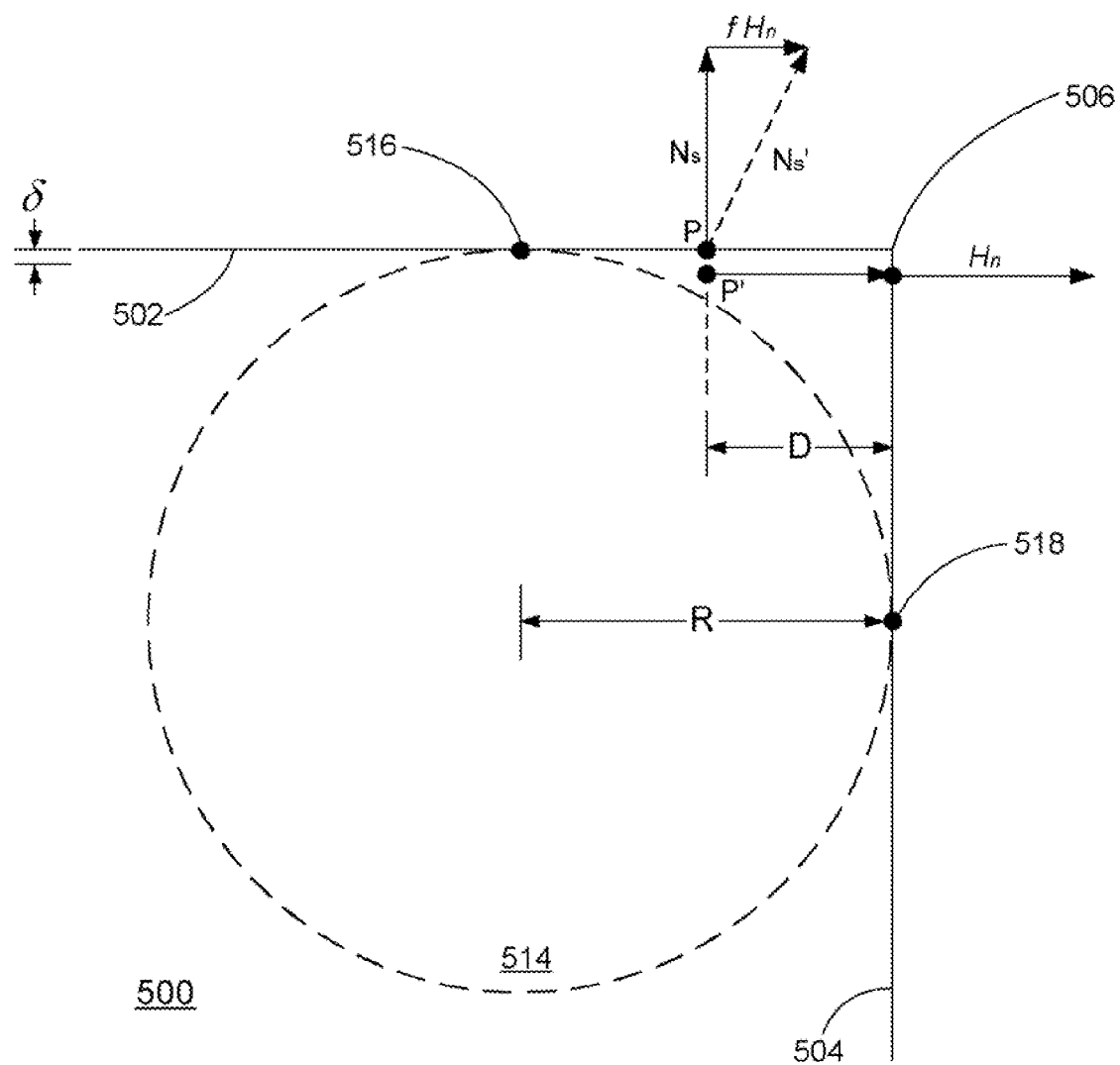
FIG. 6 is a diagram of a portion of an object, illustrating a further example of an aspect of the present invention.

A further example of the above-described techniques is illustrated in FIG. 6, which is a diagram of a portion of a modeled object 500 including a first, original surface 502 and a second, neighboring surface 504 that meet at an edge 506, for which it is desired to create a rounded appearance.

A system user provides as an input a desired radius R for the rounded edge. Conceptually speaking, the inputted radius R is the radius of a circle 514 that is tangent to both the original surface 502 and the neighboring surface 504 at respective points 516 and 518. The described techniques create the visual impression of a curved surface extending between points 516 and 518, without modifying the geometry of the modeled object 500. As discussed above, the described technique creates the desired visual effect by modifying the respective shading normals of each modeled point on the first surface 502 between point 516 and edge 506, and on the second surface between edge 506 and point 518.

The technique is now described with respect to an exemplary point P on the original surface 502. Point P has an initial shading normal $N_s$.

In the present example, it is assumed mat no adjacency information is available, and that therefore a ray casting technique is used to locate hit points on neighboring surfaces. However, as discussed above, if adjacency information is available, then hit points may be located through a simple lookup operation without the need for a ray casting technique.

Assuming that no adjacency information is available, a ray casting technique is used to locate hit points on neighboring surfaces. As discussed above, the rays are cast along a plane thai is tangential to the geometrical normal of point P. For the purposes of the present discussion, it is assumed that the geometrical normal is the same as the shading normal, and that surface 102 lies on the tangent plane.

In order to prevent self-intersection. Point P and the tangent plane are displaced by distance δ, not drawn to scale. As mentioned above, a suitable value for δ is R/1000. Displaced point P' is used as the source point in a ray-casting operation, using rays extending along the displaced tangent plane. As mentioned above, satisfactory results have been obtained by using six equally spaced rays emanating from source point P'.

There is then calculated the distance D between source point P' and hit point H. There is also calculated the shading normal $H_n$ for the hit point H. The values for distance D, radius R, unmodified shading normal $N_s$, and hit point shading normal $H_s$ are then incorporated into Equation (2) to calculate a value for weighting factor f.

After weighting factor f has been calculated, it is then multiplied to the hit normal shading vector $H_n$ to produce a weighted vector $f\cdot H_n$. As expressed by Equation (3), the weighted hit normal shading vector $f\cdot H_n$ is then added to original shading normal $N_s$ to produce modified shading normal $N_s'$.

As discussed above, the process is repeated iteratively for each ray emanating from the source point, and the weighted contributions of each additional hit point are added to the shading normal.

After the iterations have been completed, the resulting modified shading normal is normalized to have a length of 1. The normalized, modified shading normal $|N_s'|$ is then used by the shader during rendering of the image.

2.7 Overall Methods

FIGS. 7-11 are flowcharts of methods in accordance with the present invention and the discussion above.

Figure 7:
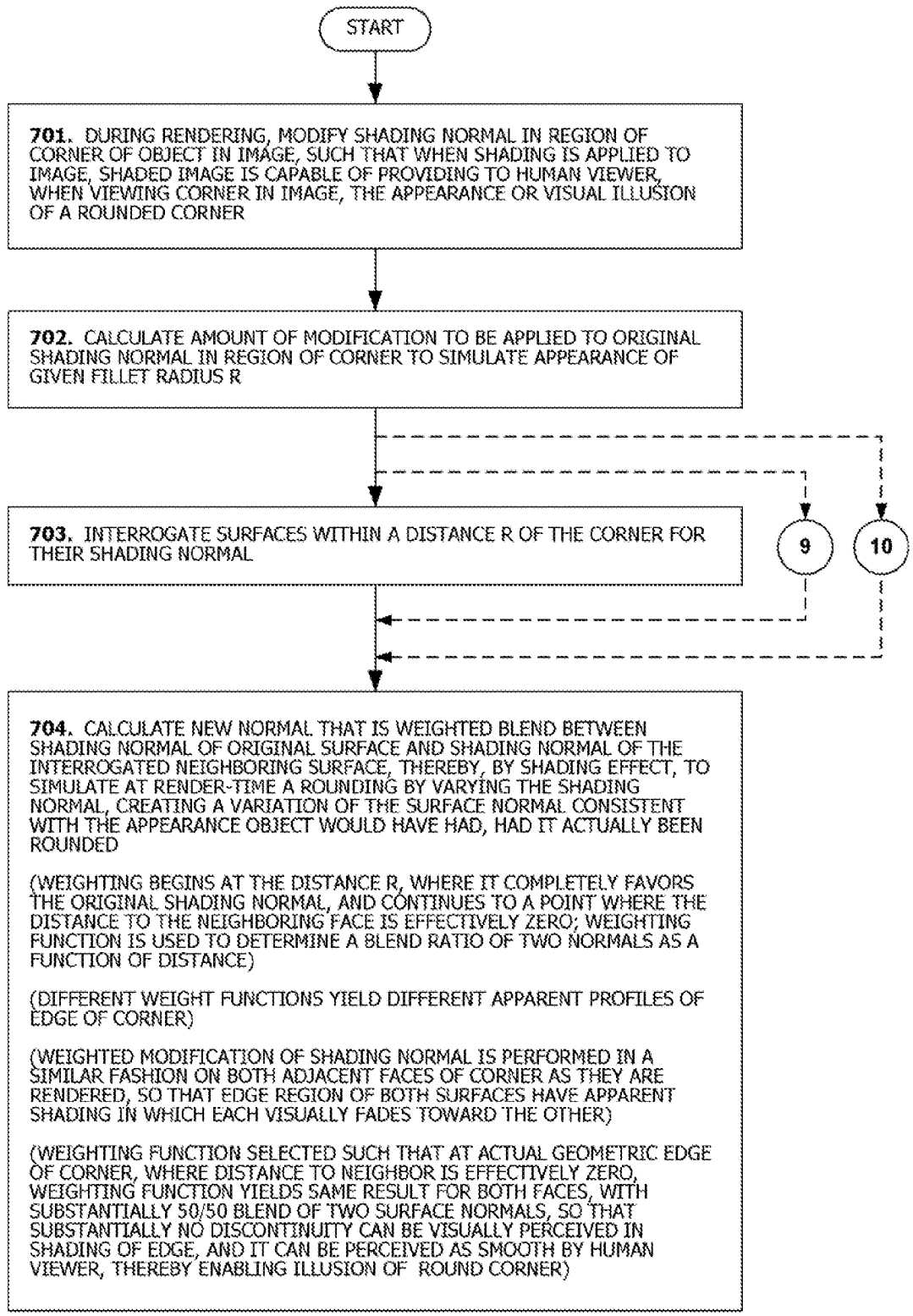
FIGS. 7-11 show a series of flowcharts illustrating general techniques according to the presently described aspects of the invention.

FIG. 7 is directed to a technique 700, including the following:

Box 701: During rendering, modify shading normal in region of corner of object in image, such that when shading is applied to an image, the shaded image is capable of providing lo a human viewer, when viewing a corner in the image, the appearance or visual illusion of a rounded corner.

Box 702: Calculate amount of modification to be applied to original shading normal in region of corner to simulate appearance of given fillet radius R.

Box 703: Interrogate surfaces within a distance R of the corner for their shading normal. (FIGS. 9 aid 10, discussed below, show various alternatives for Box 703.)

Box 704: Calculate a new normal that is a weighted blend between the shading normal of original surface and the shading normal of the interrogated neighboring surface, thereby to simulate at render-time, by the shading effect, a rounding of the corner—by varying the shading normal, creating a variation of the surface normal consistent with the appearance the object would have had, had it actually been rounded. As noted in the diagram, and discussed above, in one aspect of the invention, weighting begins at the distance R, where it completely favors the original shading normal, and continues to a point where the distance to the neighboring face is effectively zero; the weighting function is used to determine a blend ratio of two normals as a function of distance. Different weight functions yield different apparent profiles of the edge of the corner. In various aspects of the invention, weighted modification of the shading normal is performed in a similar fashion on both adjacent faces of corner as they are rendered, so that the edge region of both surfaces have apparent shading in which each visually fades toward the other. Also as noted above, in one aspect of the invention, the weighting function is selected such that at the actual geometric edge of corner, where the distance to the neighbor is effectively zero, the weighting function yields same result for both faces, with substantially 50/50 blend of two surface normals, so that substantially no discontinuity can be visually perceived in the shading of the edge, and it can be perceived as smooth by human viewer, thereby enabling illusion of rounded corners.

Figure 8:
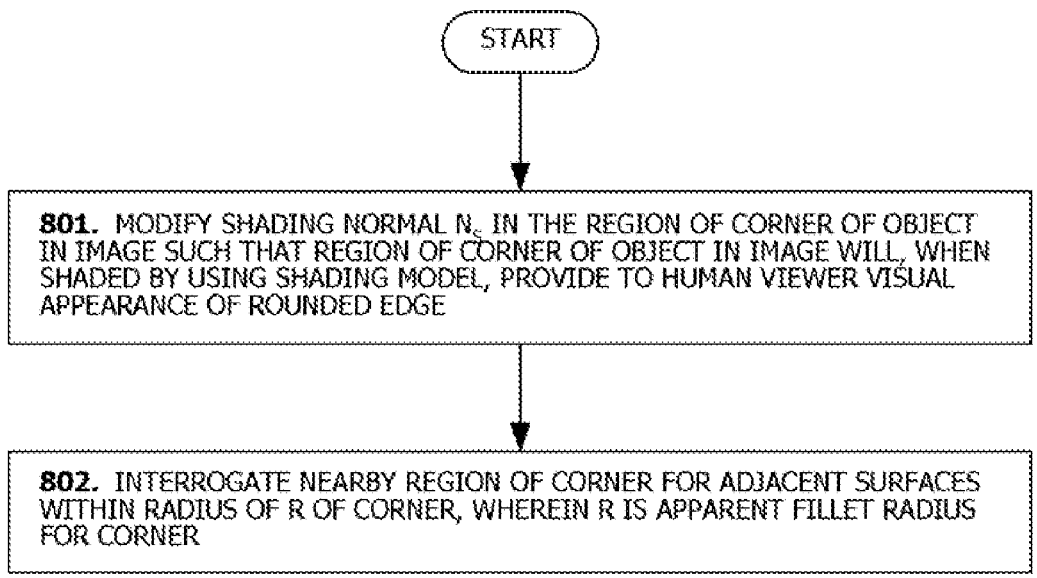

FIG. 8 shows a technique 800 that is a variation of the technique 700 shown in FIG. 7, and includes the following:

Box 801: Modify shading normal $N_s$ in the region of corner of object in image such that region of corner of object in image will, when shaded by using shading model, provide to human viewer visual appearance of rounded edge.

Box 802: Interrogate nearby region of corner for adjacent surfaces within radius of r of corner, wherein R is apparent fillet radius for corner.

Figure 9:
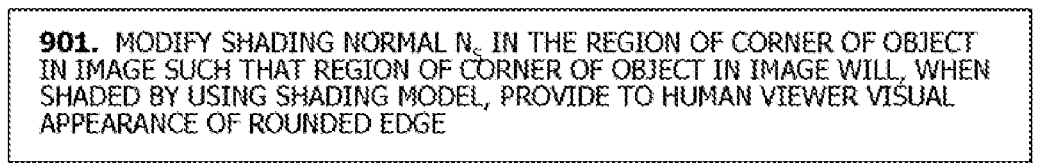

FIG. 9 shows an alternative 900 for Box 703 of FIG. 7, and includes the following:

Box 901: Interrogate by querying data structures associated with scene for adjacency information useable to find adjacent surfaces within a radius r of the corner.

Figure 10:
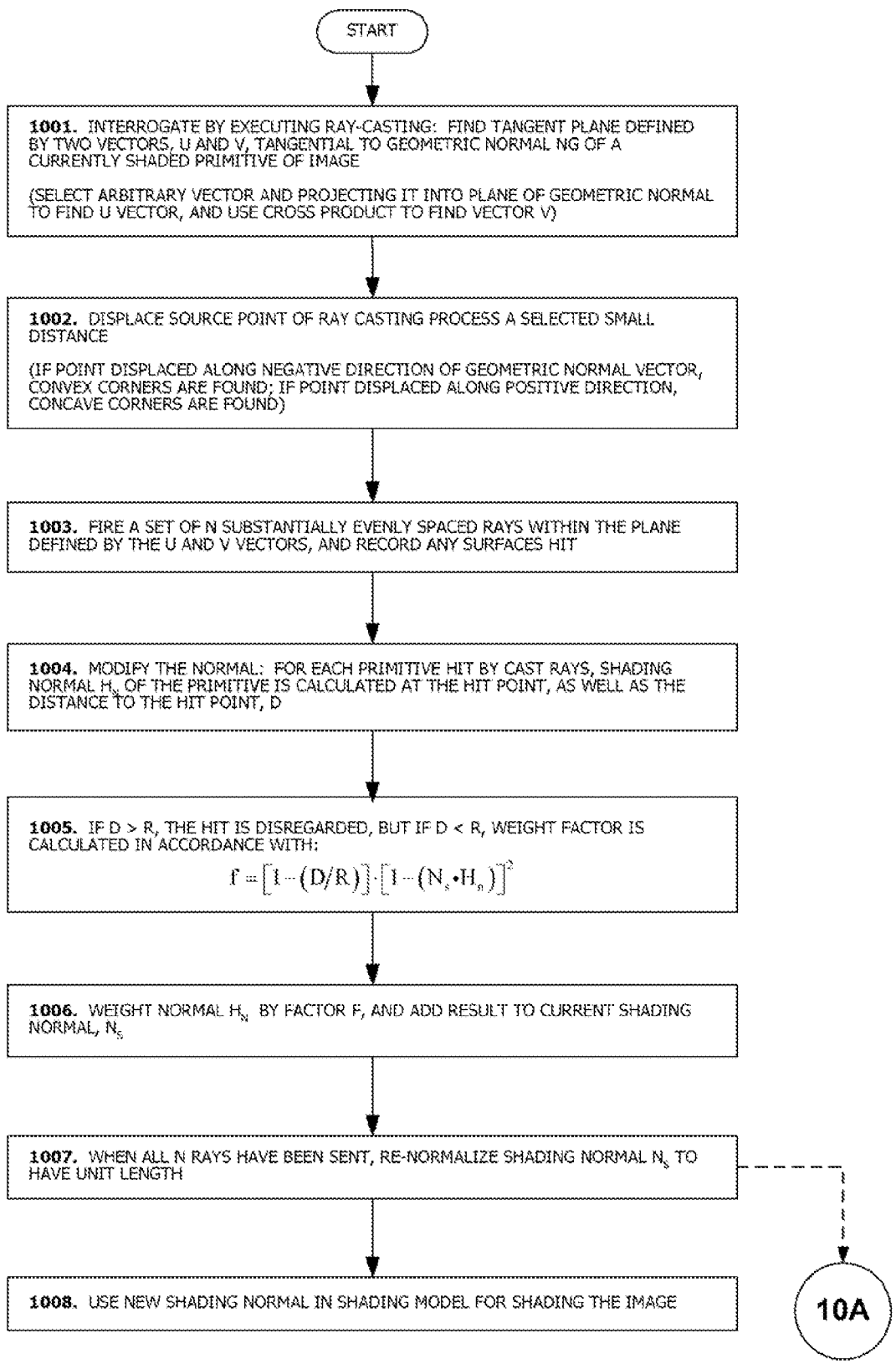

FIG. 10 shows a second alternative 1000 for Box 703 of FIG. 7, this one utilizing ray casting, and includes the following:

Box 1001: Interrogate by executing ray casting: find tangent plane defined by two vectors, u and v, tangential to geometric normal $N_g$ of a currently shaded primitive of image. In one aspect or example of the invention, vector-finding can include the following: select arbitrary vector and project it into plane of geometric normal to find vector u, and use cross product to find vector v.

Box 1002: Displace source point of ray casting process a selected small distance. If the point is displaced along the negative direction of the geometric normal vector, convex corners are found; if the point is displaced along the positive direction, concave corners are found.

Box 1003: Fire a set of n substantially evenly spaced rays within the plane defined by the u and v vectors, and record any surfaces hit.

Box 1004: Modify the normal: For each primitive hit by cast rays, shading normal $H_n$ of the primitive is calculated at the hit point, as well as the distance to the hit point, D.

Box 1005: If D>R, the hit is disregarded, but if D<R, weight factor is calculated in accordance with:

$$f = [1-(D/R)] \cdot [1-(N_s \cdot H_n)]^2$$

Box 1006: Weight normal $H_n$ by factor f, and add result to current shading normal, $N_s$.

Box 1007: When all n rays have been sent, re-normalize shading normal $N_s$ to have unit length.

Box 1008: Use new shading normal in shading model for shading the image.

Figure 10A:
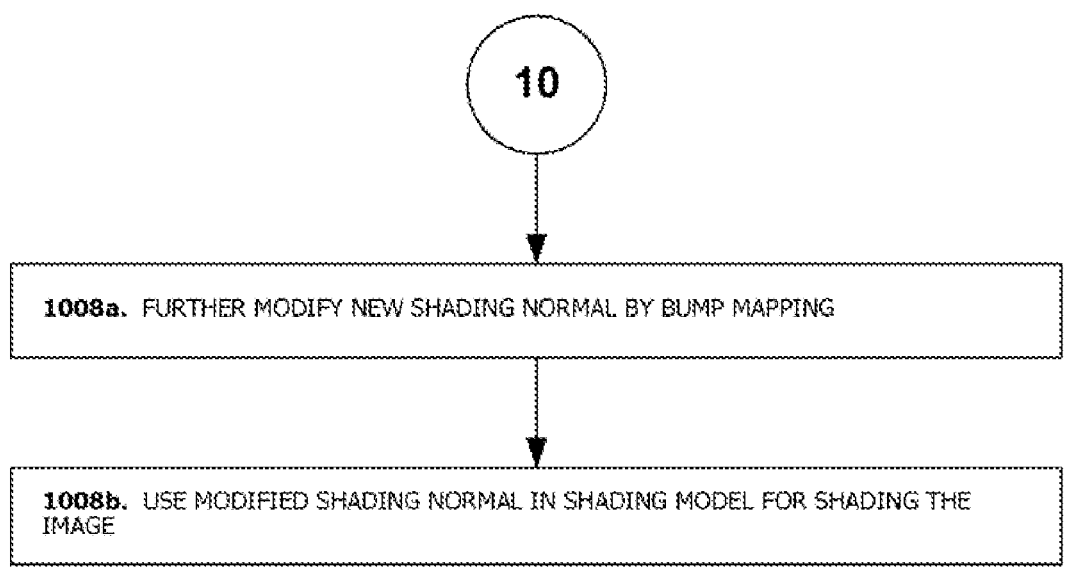

FIG. 10A shows an alternative for Box 1008, and includes the following:

Box 1008a: Further modify new shading normal by bump mapping.

Box 1008b: Use modified shading normal in shading model for shading the image.

Figure 11:
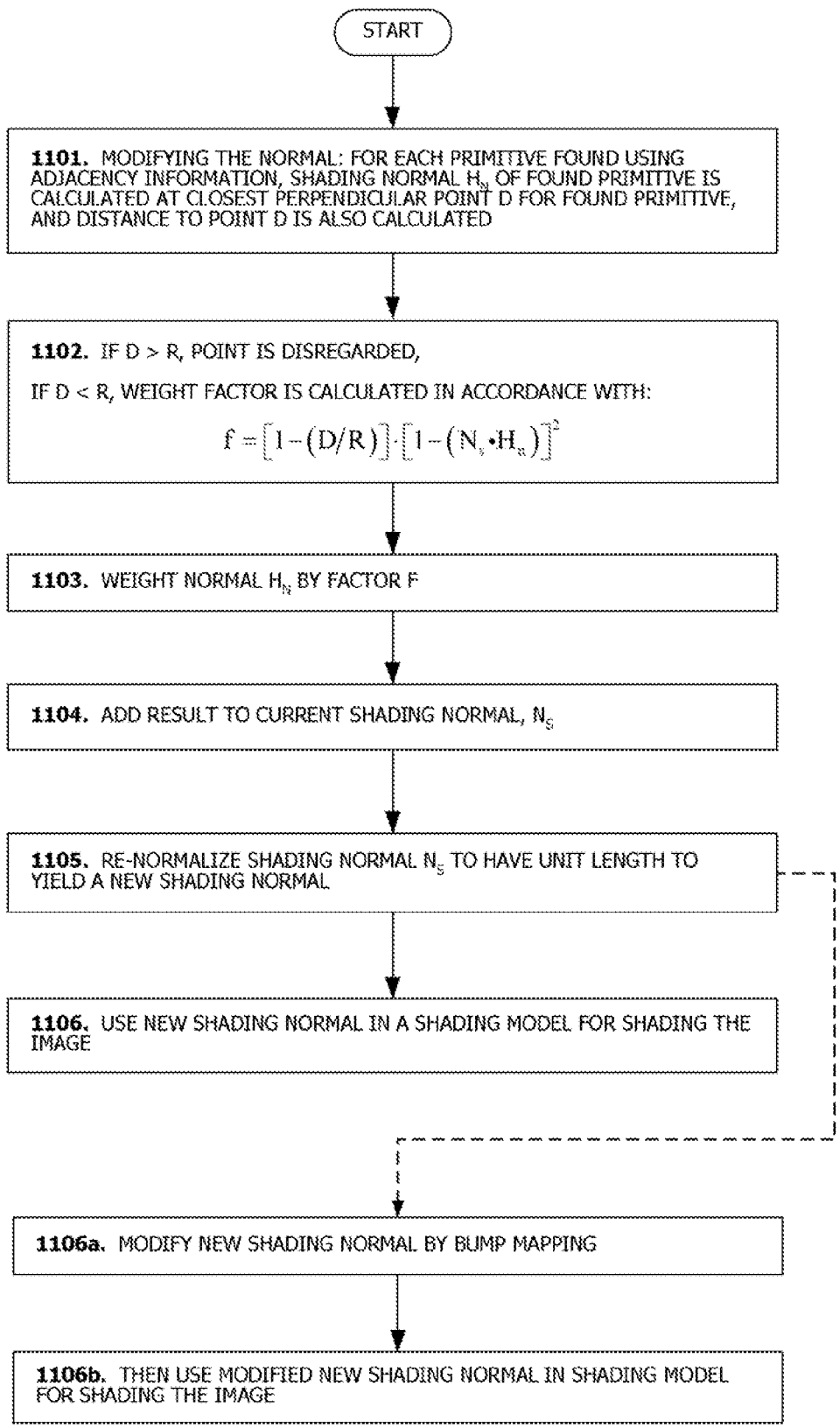

FIG. 11 shows a technique 1100 that uses adjacency information (instead of ray casting), and includes the following:

Box 1101: Modifying the normal: for each primitive found using adjacency information, shading normal $H_n$ of found primitive is calculated at closest perpendicular point D for found primitive, and distance to point d is also calculated.

Box 1102: If D>R, point is disregarded. If D<R, a weight factor is calculated in accordance with:

$$f = [1-(D/R)] \cdot [1-(N_s \cdot H_n)]^2$$

Box 1103: Weight normal $H_n$ by factor f.

Box 1104: Add result to current shading normal, $N_s$.

Box 1105: Re-normalize shading normal ns to have unit length to yield a new shading normal.

Box 1106: Use new shading normal in a shading model for shading the image.

FIG. 11 further shows an alternative for Box 1106, including the following:

Box 1106a: Modify new shading normal by bump mapping.

Box 1106b: Then use modified new shading normal in shading model for shading the image.

3. Typical Digital Processing Environment in which Invention can be Implemented The following is a discussion, to be read in connection with FIGS. 12-14, of typical, relatively conventional digital processing structures and environments in which the above-described invention may be implemented and practiced.

It will be understood by those skilled in the art that the present invention, as described above, provides methods, systems, devices and computer program products that enable the creation of the appearance of rounded corners and edges and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in tire generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The previous detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

Figure 12:
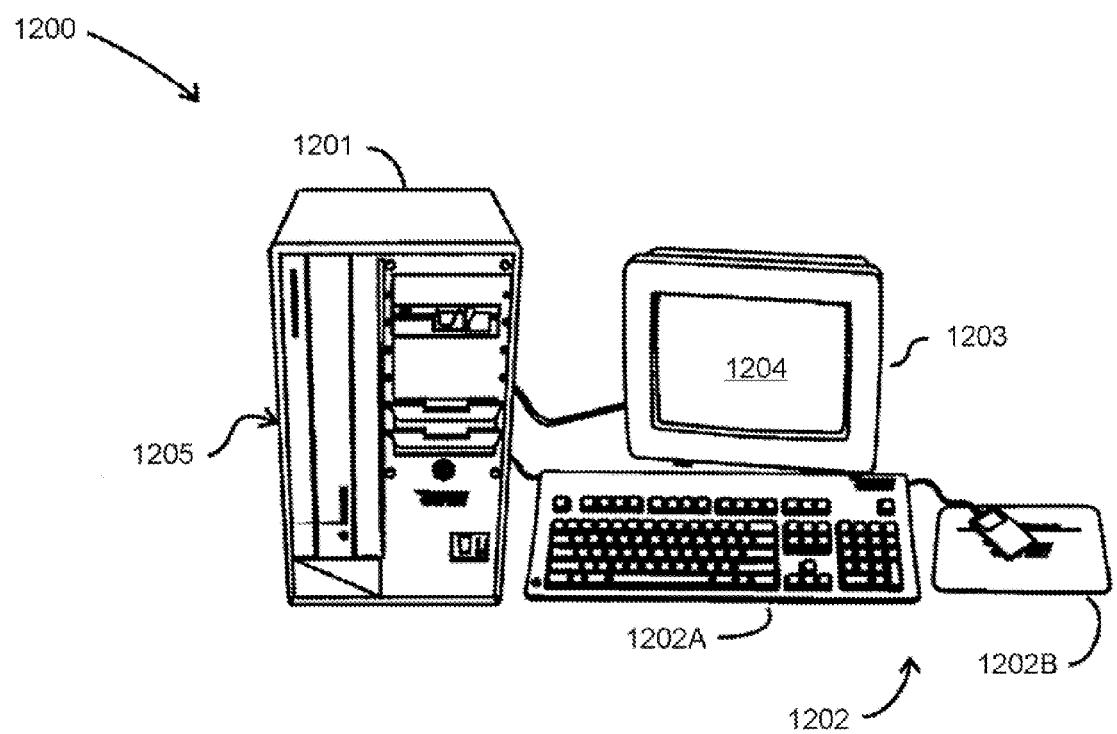
FIG. 12 shows a schematic diagram of a conventional personal computer, or like computing apparatus, in which aspects of the present invention can be deployed.

As an example, FIG. 12 attached hereto depicts an illustrative computer system 1200 that can carry out such computer graphics processes. With reference to FIG. 12, the computer system 1200 in one embodiment includes a processor module 1201 and operator interface elements comprising operator input components such as a keyboard 1202A and/or a mouse 1202B (or digitizing tablet or other analogous element(s), generally identified as operator input element(s) 1202) and an operator output element such as a video display device 1203. The illustrative computer system 1200 can be of a conventional stored-program computer architecture. The processor module 1201 can include, for example, one or more processor, memory and mass storage devices, such as disk and/or tape storage elements (not separately shown), which perform processing and storage operations in connection with digital data provided thereto. The operator input elements) 1202 can be provided to permit an operator to input information for processing. The video display device 1203 can be provided to display output information generated by the processor module 1201 on a screen 1204 to the operator, including data that the operator may input for processing, information that the operator may input to control processing, as well as information generated during processing. The processor module 1201 can generate information for display by the video display device 1203 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and or stored on a computer readable medium, whether that medium is fixed or removable, permanent or erasable, or otherwise As noted, for example, in block 1322 of the schematic block diagram of FIG. 14, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for earning out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 1200 is shown as comprising particular components, such as the keyboard 1202A and mouse 1202B for receiving input information from an operator, and a video display device 1203 for displaying output information to the operator, it will be appreciated that the computer system 1200 may include a variety of components in addition to or instead of those depicted in FIG. 12.

In addition, the processor module 1201 can include one or more network ports, generally identified by reference numeral 1205, which are connected to communication links which connect the computer system 1200 in a computer network. The network ports enable the computer system 1200 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for earning signals among the computer systems. Computer systems transfer information over the network by means of messages transferred over the communication links, with each message including information and an identifier identifying the device to receive the message.

Figure 13:
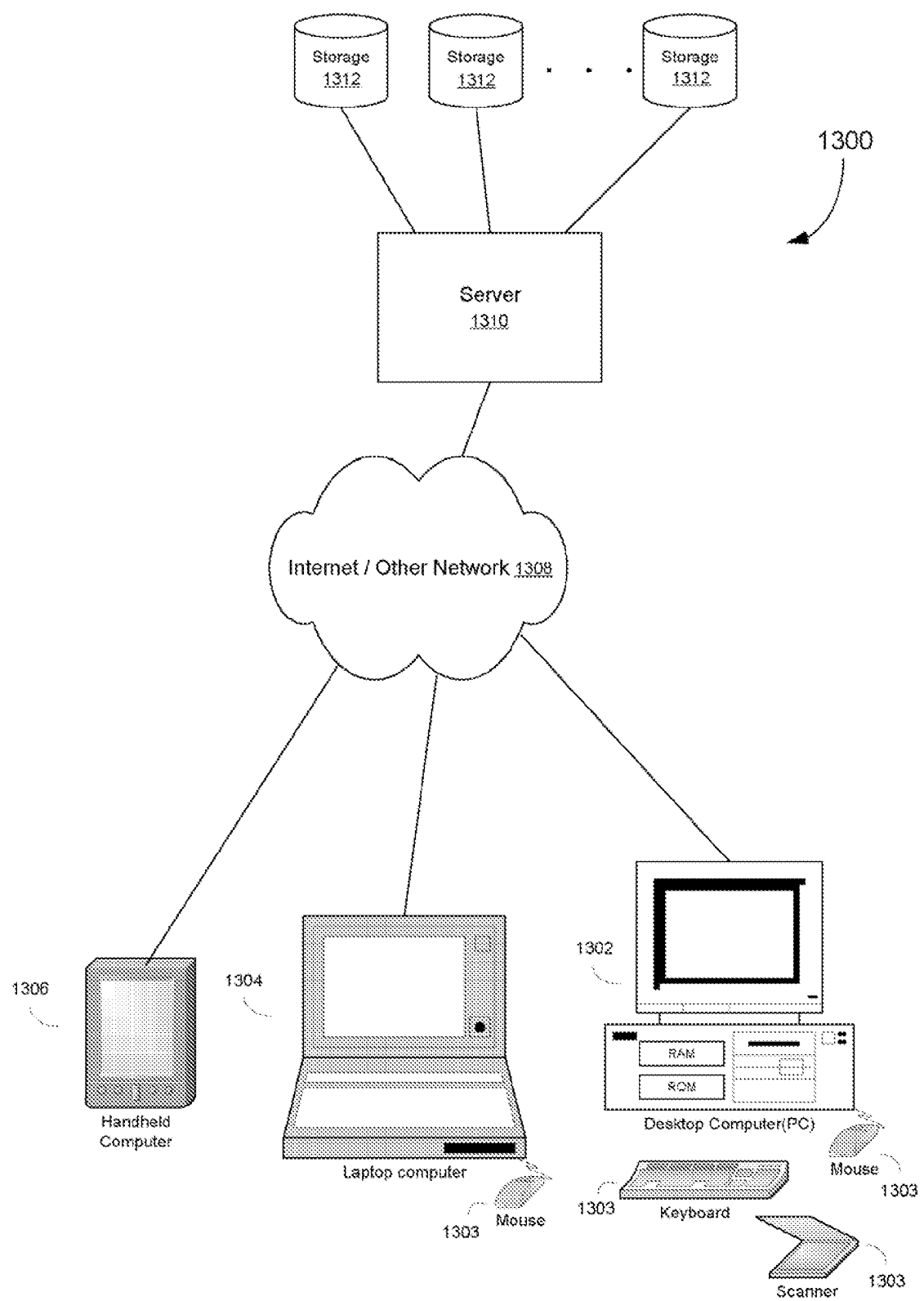
FIGS. 13 and 14 show schematic diagrams illustrating a conventional network-based computing system and network devices, in which aspects of the present invention can be deployed.
Figure 14:
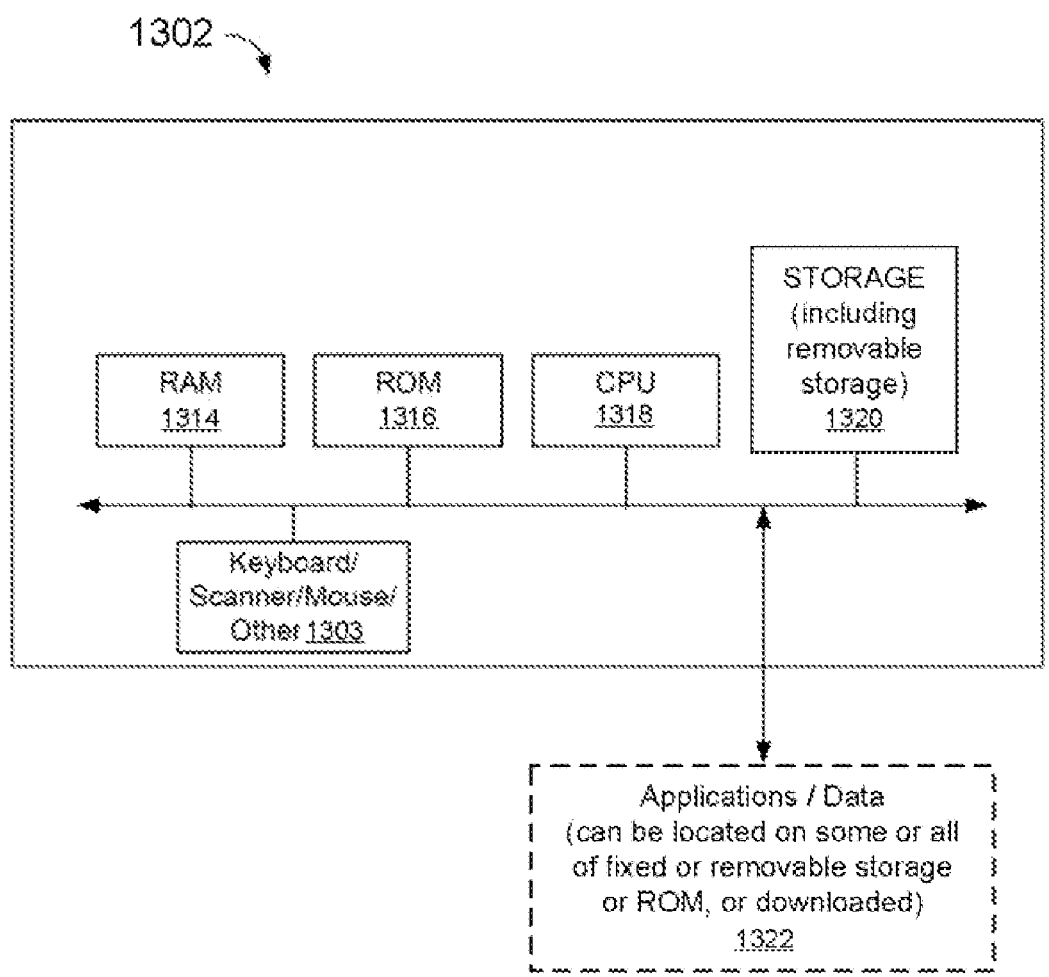

In addition to the computer system 1200 shown in the drawings, methods, devices or software products in accordance with the present invention can operate on any of a wide range of conventional computing devices and systems, such as those depicted by way of example in FIGS. 13 and 14 (e.g., network system 1300), whether standalone, networked, portable or fixed, including conventional PCs 1302, laptops 1304, handheld or mobile computers 1306, or across the Internet or other networks 1308, which may in turn include servers 1310 and storage 1312.

In line with conventional computer software and hardware practice, a software application configured in accordance with the invention can operate within, e.g., a PC 1302 like that shown in FIGS. 13-14, in which program instructions can be read from ROM or CD ROM 1316 (FIG. 14), magnetic disk or other storage 1320 and loaded into RAM 1314 for execution by CPU 1318. Data can he input into the system via any known device or means, including a conventional keyboard, scanner, mouse, digitizing tablet, or other elements 1303. As shown in FIG. 14, the depicted storage 1320 includes removable storage. As further shown in FIG. 14, applications and data 1322 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown in FIGS. 1-11, discussed above.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts are not necessarily part of the present invention, and their selection can be left to the implementer.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. A method, executable in a computer graphics system operable to render images using an image rendering process, and to apply shading to rendered images using a shading model, wherein the computer graphics system is operable to render images by applying a shading model to geometric representations constructed from a scene description containing geometric primitives, and wherein, as a surface point P is being shaded, it is assumed to have one shading normal $N_s$, and one geometric normal $N_g$, the method comprising:

modifying the shading normal in the region of a corner of an object in the image such that the region of the corner of the object in the image will, when shaded by using a shading model, provide to a human viewer the visual appearance of a rounded edge, the modifying comprising:

interrogating the nearby region of the corner for adjacent surfaces within a radius of R of the corner, wherein R is the apparent fillet radius for the corner, the interrogating comprising querying data structures associated with the scene for adjacency information usable to find adjacent surfaces within a radius R of the corner, wherein the interrogating comprises executing a ray-casting process, the ray-casting process comprising:

finding a tangent plane defined by two vectors, u and v, that arc tangential to the geometric normal of a currently shaded primitive of the image, wherein vector finding is accomplished by selecting an arbitrary vector and projecting it into the plane of the geometric normal to find the u vector, and using a cross product to find the vector v; and wherein the process further comprises modifying the normal, wherein for each primitive hit by the cast rays, a shading normal $H_n$ of the primitive is calculated at the hit point, as well as the distance to the hit point, D;

if D>R, the hit is disregarded, but if D<R, a weight factor is calculated in accordance with:

$$f=[1-(D/R)]\cdot[1-(N_s\cdot H_n)]^2;$$

and then, the normal $H_n$ is weighted by factor f, and the result is added to the current shading normal, $N_s$.

2. The method of claim 1, wherein:

the ray casting process further comprises displacing the source point of the ray casting process a selected small distance.

3. The method of claim 2, wherein if the point is displaced along the negative direction of the geometric normal vector, convex corners are found: and if the point is displaced along the positive direction, concave corners are found.

4. The method of claim 2, wherein the ray casting process further comprises:

firing a set of n substantially evenly spaced rays within the plane defined by the u and v vectors, and recording any surfaces hit.

5. The method of claim 1 wherein:

when all n rays have been sent, the shading normal $N_s$ is re-normalized to have unit length, and then, the new shading normal can be used by a shading model for shading the image.

6. The method of claim 5 wherein the new shading normal can be further modified by bump mapping before being used by a shading model for shading the image.

7. The method of claim 1 further comprising:
re-normalizing the shading normal $N_s$ to have unit length to yield a new shading normal, and
utilizing the new shading normal in a shading model for shading the image.

8. The method of claim 7 wherein the new shading normal can be further modified by bump mapping before being used by a shading model for shading the image.

9. A computer program product comprising a non-transitory, computer-readable storage medium and computer-executable program code stored on the computer-readable storage medium, the computer-executable program code being executable by a computer graphics system operable to render images using an image rendering process, and to apply shading to rendered images using a shading model, wherein the computer graphics system is operable to render images by applying a shading model to geometric representations constructed from a scene description containing geometric primitives, and wherein, as a surface point P is being shaded, it is assumed to have one shading normal $N_s$ and one geometric normal $N_g$, the computer-executable program code comprising:

first computer-executable program code operable within the computer graphics system to enable the computer graphics system to modify the shading normal in the region of a corner of an object in the image such that the region of the corner of the object in the image will, when shaded by using a shading model, provide to a human viewer the visual appearance of a rounded edge, the first computer-executable program code comprising:

second computer-executable program code operable within the computer graphics system to enable the computer graphics system to interrogate the nearby region of the corner for adjacent surfaces within a radius of R of the corner, wherein R is the apparent fillet radius for the corner, the interrogating comprising querying data structures associated with the scene for adjacency information usable to find adjacent surfaces within a radius R of the corner, wherein the interrogating comprises executing a ray-casting process, the ray-casting process comprising:

finding a tangent plane defined by two vectors, u and v, that are tangential to the geometric normal of a currently shaded primitive of the image, wherein vector finding is accomplished by selecting an arbitrary vector and projecting it into the plane of the geometric normal to find the u vector, and using a cross product to find the vector v; and wherein the first computer-executable program code further comprises third computer-executable program code operable within the computer graphics system to enable the computer graphics system to modify the normal, wherein for each primitive hit by the cast rays, a shading normal $H_n$ of the primitive is calculated at the hit point, as well as the distance to the hit point, D:

if D >R, the hit is disregarded, but if D<R, a weight factor is calculated in accordance with:

$$f = [1-(D/R)] \cdot [1-(N_s \cdot H_n)]^2;$$

and then, the normal $H_n$ is weighted by factor f, and the result is added to the current shading normal, $N_s$.

10. A subsystem operable in a computer graphics system, the computer graphics system being operable to render images using an image rendering process, and to apply shading to rendered images using a shading model, wherein the computer graphics system is operable to render images by applying a shading model to geometric representations constructed from a scene description containing geometric primitives, and wherein, as a surface point P is being shaded, it is assumed to have one shading normal $N_s$ and one geometric normal $N_g$, the subsystem comprising:

means for modifying the shading normal in the region of a corner of an object in the image such that the region of the corner of the object in the image will, when shaded by using a shading model, provide to a human viewer the visual appearance of a rounded edge, the modifying comprising:

interrogating the nearby region of the corner for adjacent surfaces within a radius of R of the corner, wherein R is the apparent fillet radius for the corner, the interrogating comprising querying data structures associated with the scene for adjacency information usable to find adjacent surfaces within a radius R of the corner, wherein the interrogating comprises executing a ray-casting process, the ray-casting process comprising:

finding a tangent plane defined by two vectors, u and v, that are tangential to the geometric normal of a currently shaded primitive of the image, wherein vector finding is accomplished by selecting an arbitrary vector and projecting it into the plane of the geometric normal to find the u vector, and using a cross product to find the vector v; and wherein the subsystem further comprises means for modifying the normal, wherein for each primitive hit by the cast rays, a shading normal $H_n$ of the primitive is calculated at the hit point, as well as the distance to the hit point, D;

if D>R, the hit is disregarded, but if D<R, a weight factor is calculated in accordance with:

$$f = [1-(D/R)] \cdot [1-(N_s \cdot H_n)]^2;$$

and then, the normal $H_n$ is weighted by factor f, and the result is added to the current shading normal, $N_s$.

* * * * *